(12) United States Patent
Bunel et al.

(10) Patent No.: US 9,188,064 B2
(45) Date of Patent: Nov. 17, 2015

(54) FUEL INJECTION SYSTEM FOR TURBOJET ENGINE AND METHOD OF ASSEMBLING SUCH AN INJECTION SYSTEM

(75) Inventors: Jacques Marcel Arthur Bunel, Thiasis (FR); Mario César De Sousa, Cesson (FR); Guillaume Sevi, Ivry sur Seine (FR); Brice Arnaud Demoulin, Cesson (FR)

(73) Assignee: SNECMA, Paris (FR)

( * ) Notice: Subject to any disclaimer, the term of this patent is extended or adjusted under 35 U.S.C. 154(b) by 456 days.

(21) Appl. No.: 13/812,259

(22) PCT Filed: Jul. 18, 2011

(86) PCT No.: PCT/FR2011/051703
§ 371 (c)(1),
(2), (4) Date: Jan. 25, 2013

(87) PCT Pub. No.: WO2012/022873
PCT Pub. Date: Feb. 23, 2012

(65) Prior Publication Data
US 2013/0118177 A1     May 16, 2013

(30) Foreign Application Priority Data
Jul. 26, 2010 (FR) ..................................... 10 56125

(51) Int. Cl.
| | | |
|---|---|---|
| F02C 1/00 | (2006.01) | |
| B21D 39/03 | (2006.01) | |
| F02C 7/22 | (2006.01) | |
| F23R 3/00 | (2006.01) | |
| F23R 3/14 | (2006.01) | |

(52) U.S. Cl.
CPC . *F02C 7/22* (2013.01); *F23R 3/002* (2013.01); *F23R 3/14* (2013.01); *F23R 2900/03041* (2013.01); *Y10T 29/49826* (2015.01)

(58) Field of Classification Search
CPC .............. F02C 7/22; F23R 3/002; F23R 3/14; F23R 2900/03041; Y10T 29/49826
USPC ........................ 60/798, 740, 752, 800; 29/428
See application file for complete search history.

(56) References Cited

U.S. PATENT DOCUMENTS

| 4,999,996 A | 3/1991 | Duchene et al. | |
|---|---|---|---|
| 7,793,417 B2 * | 9/2010 | Akabane ...................... | 29/888.4 |

(Continued)

FOREIGN PATENT DOCUMENTS

| EP | 1 508 743 A2 | 2/2005 |
|---|---|---|
| EP | 1 731 837 A2 | 12/2006 |
| FR | 2 903 169 | 1/2008 |

OTHER PUBLICATIONS

International Search Report as issued for PCT/FR2011/051703.

*Primary Examiner* — Hoang Nguyen
(74) *Attorney, Agent, or Firm* — Pillsbury Winthrop Shaw Pittman LLP

(57) ABSTRACT

A fuel injection system for a turbojet engine including a fixed part and a sliding lead-through, the fixed part and the sliding lead-through extending along a reference axis, the fixed part including a cavity that has a bottom and a closure cup, the sliding lead-through being provided with a sole plate contained inside the cavity. The injection system has increased resistance to wearing of the injector on which it is mounted. To achieve this it further includes a spring arranged in such a way as to apply to the sole plate a force capable of preventing the vibration-induced micro-movements of the sliding lead-through with respect to the fixed part in the absence of thermal expansion.

15 Claims, 5 Drawing Sheets

(56) References Cited

U.S. PATENT DOCUMENTS

2002/0184891 A1* 12/2002 Conete et al. ............... 60/796
2005/0217269 A1* 10/2005 Myers et al. ............... 60/739
2009/0293489 A1* 12/2009 Tuthill et al. ............... 60/752
2012/0255275 A1* 10/2012 Bunel et al. ............... 60/39.827

* cited by examiner

FUEL INJECTION SYSTEM FOR TURBOJET ENGINE AND METHOD OF ASSEMBLING SUCH AN INJECTION SYSTEM

CROSS REFERENCE TO RELATED APPLICATIONS

This application is the U.S. National Stage of PCT/FR2011/051703, filed Jul. 18, 2011, which in turn claims priority to French Patent Application No. 1056125, filed Jul. 26, 2010, the entire contents of all applications are incorporated herein by reference in their entireties.

FIELD OF THE INVENTION

The present invention relates to an injection system for a turbojet engine and to a method of assembling such an injection system. The present invention also relates to a combustion chamber comprising at least one such injection system.

PRIOR ART

Combustion chambers of turbojet engines generally comprise an inner wall and an outer wall connected at their upstream ends via an annular base in order to define an annular combustion chamber base. Injection systems which are evenly distributed over the periphery of the combustion chamber base deliver a mixture of air and fuel which is ignited to provide combustion gases.

FIG. 1 shows a partial diagrammatic view of such a prior art combustion chamber. The combustion chamber 2 has longitudinal rotational symmetry with respect to a general axis of the turbine. It comprises an inner casing wall 4 and an outer casing wall 6. An inner chamber wall 8 defines a passage 10 with the inner casing wall 4 and an outer chamber wall 12 defines a passage 14 with the outer casing wall 6.

The inner 8 and outer 12 chamber walls are connected via a chamber base 16 at their upstream ends. A plurality of injection systems 1, typically fourteen to twenty-two, which are evenly angularly spaced (only one injection system has been shown in FIG. 1) are provided on the chamber base 16.

As can be seen in more detail in FIG. 2, each injection system 1 comprises a fixed portion 3 which comprises a cavity 11 defined by a base 7, a side wall 5 and a closing cup 44. The base 7 is in the shape of a ring, as is the closing cup 44. The side wall 5 has a cylindrical shape about a reference axis Y. The fixed portion 3 also comprises a swirler element 24, a Venturi 25 and a bowl 28. The base 7 forms a shoulder which projects radially from the swirler element 24. The swirler element 24 is mounted on the bowl 28. The bowl 28 is connected to the chamber base 16 via a deflector 20 and two half-rings 22. The swirler element 24 comprises a first stage of blades or ribs 30 and a second stage of blades or ribs 32 which function so as to cause the air to rotate about the reference axis Y of the injection system. The blades or ribs of stages 30 and 32 may be orientated in the same or in opposing directions. The fixed portion 3 extends about the reference axis Y and has rotational symmetry about this axis.

A relatively large clearance is provided between the upper surface of the flange 36 of the sliding cross-member 26 and the closing cup 44. This clearance is intended to provide the sliding cross-member 26 with radial mobility and to accommodate manufacturing tolerances when the combustion chamber is mounted on the injectors.

A combustion chamber provided with such an injection system is described, for example, in the document EP 1 731 837.

However, with such a combustion chamber provided with such an injection system, the Applicant has observed that the tip of the injector suffers substantial wear and a reduced service life.

DISCLOSURE OF THE INVENTION

The invention is intended to overcome, at least in part; the disadvantages of the prior art by proposing an injection system that can be used to limit wear of the tip of the injector.

To this end, in a first aspect, the invention proposes a fuel injection system for a turbojet engine, comprising a fixed portion and a sliding cross-member, the fixed portion and the sliding cross-member extending along a reference axis, the fixed portion comprising a cavity defined axially by a base and a closing cup, the sliding cross-member being provided with a flange contained in the cavity, the injection system further comprising spring means disposed in the cavity so as to exert an axial force on the flange.

Thus, in contrast to prior art injection systems, the injection system of the invention comprises spring means which are pre-stressed in the cavity upon assembly and which press the flange of the sliding cross-member against the base of the cavity or against the closing cup so as to prevent vibrations in the sliding cross-member in the cavity during operation. In fact, by preventing travel of the sliding cross-member in the cavity, wear on the injector tip which is inserted in the sliding cross-member is limited and thus the service life of the system is increased. However, the spring means are pre-stressed in a manner such that the sliding cross-member can be displaced radially in the cavity in order to accommodate differential expansion of the injector and of the injection system. Hence, the spring means can dispense with vibrations of the sliding cross-member in the cavity while allowing radial displacements of the sliding cross-member in the cavity in order to accommodate differential thermal expansion.

The spring means are thus capable of preventing vibrational micro-displacements of the sliding cross-member with respect to the fixed portion.

The injection system of the invention may also exhibit one or more of the features below, taken individually or in any technically possible combinations.

In a preferred embodiment, the spring means are axially constrained in the cavity. The spring means preferably allow the sliding cross-member to be displaced radially in the cavity while blocking it axially.

In a preferred embodiment, the spring means comprise a corrugated plate.

Advantageously, the corrugated plate is circular.

Advantageously, the corrugated plate has rotational symmetry with respect to the reference axis.

Advantageously, the corrugated plate is formed from an alloy comprising nickel and chromium.

In various embodiments:
the external diameter of the corrugated plate is substantially equal to the internal diameter of the cavity such that the corrugated plate is in contact with the side walls of the cavity;
the corrugated plate has an external diameter which is smaller than the internal diameter of the cavity, such that the corrugated plate is at a distance from the side walls of the cavity.

Advantageously, the sliding cross-member comprises a centring cone and the corrugated plate has an orifice at its centre with an internal diameter that is greater than the external diameter of the centring cone of the sliding cross-member such that this orifice can allow the corrugated plate to pass around the centring cone during assembly.

In accordance with another embodiment, the spring means are constituted by a coil spring with a rectangular cross section. The coil spring preferably has rotational symmetry with respect to the reference axis.

Advantageously, the cavity is defined radially by the side walls. These side walls preferably have rotational symmetry about the reference axis.

Further and preferably, the injection system of the invention comprises a washer disposed between the spring means and the flange. This washer means that the spring means can bear freely on the flange irrespective of the position of the sliding cross-member. Further, this washer means that the spring means are not in direct contact with the sliding cross-member, which is mobile. Further, the washer prevents the spring means from becoming wedged between the sliding cross-member and the side walls of the cavity.

The external diameter of the washer is preferably substantially equal to the internal diameter of the cavity, such that the washer is in contact with the side walls of the cavity. Thus, the spring means cannot become wedged between the walls of the cavity and the flange.

Advantageously, the spring means are axially constrained between the washer and the closing cup.

Advantageously, the spring means exert a force on the flange which is in the range 10 Newtons to 30 Newtons. In fact, the spring means should exert a force on the flange which is sufficiently high to prevent the sliding cross-member from vibrating. Besides the force exerted by the spring means must allow the sliding cross-member to be displaced radially in order to allow assembly of the injector and to allow the injection system, when operating, to accommodate differential thermal expansion, in particular of the injector which is inserted into the sliding cross-member.

In a further aspect, the invention proposes a combustion chamber in which the injector tip has an improved service life.

To this end, in a second aspect, the invention provides a combustion chamber comprising at least one injection system in accordance with the invention, the sliding cross-member further comprising a centring cone in which a fuel injector is inserted.

The invention also proposes an aircraft engine with an improved service life.

To this end, in a third aspect, the invention concerns an aircraft engine which comprises a combustion chamber in accordance with the second aspect of the invention.

The invention also proposes a method of assembling an injection system which accommodates differential thermal expansion and machining tolerances, which has an improved service life and wear resistance.

To this end, in a fourth aspect of the invention, a method is proposed for assembling an injection system comprising a fixed portion and a sliding cross-member, the fixed portion comprising a housing having a base, the sliding cross-member comprising a flange, the method comprising the following steps:
 (a) positioning the sliding cross-member on the fixed portion such that the flange bears on the base of the housing;
 (b) positioning the spring means; and
 (c) fixing a closing cup on the housing so as to form a cavity in which the spring means are axially constrained.

Advantageously, the method further comprises the following step between steps (a) and (b):
 (a') positioning a washer on the flange.

BRIEF DESCRIPTION OF THE FIGURES

Other characteristics and advantages of the invention will become apparent from the following description, made with reference to the accompanying figures, which show.

For the sake of clarity, identical or similar elements are provided with identical reference signs in all of the figures.

DETAILED DESCRIPTION OF AT LEAST ONE EMBODIMENT

Figure 1:
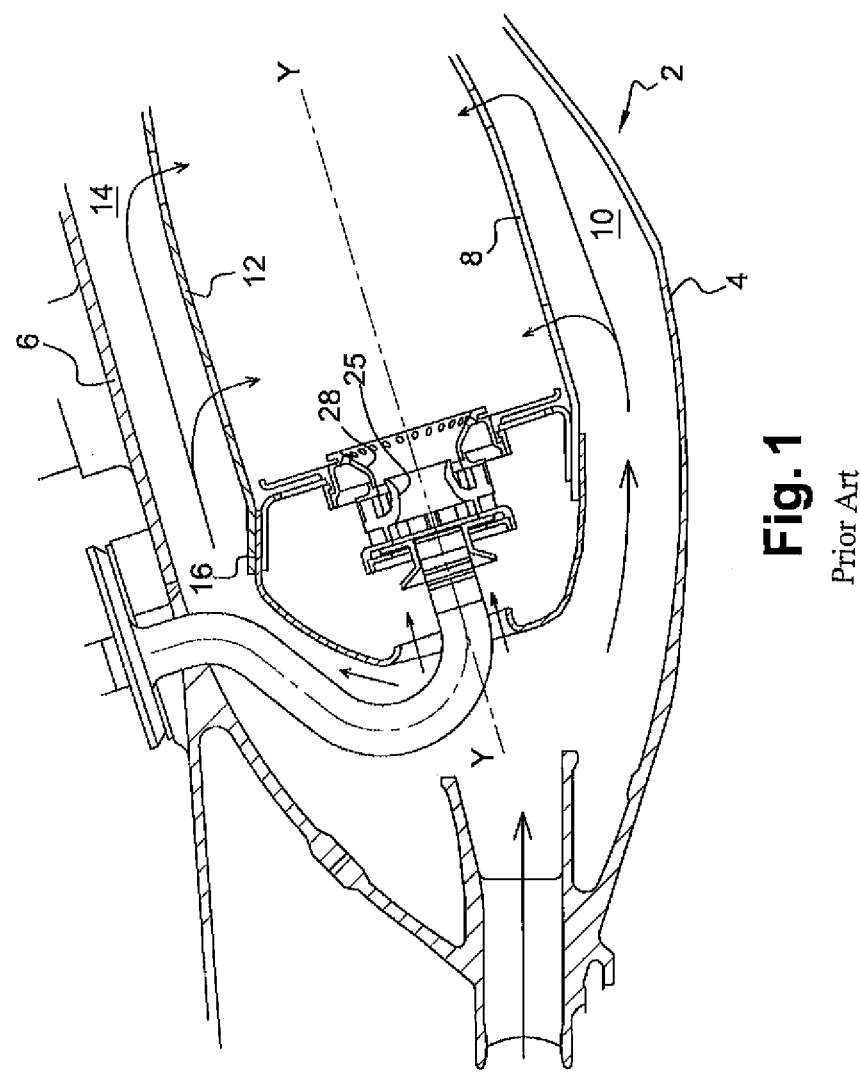
in FIG. 1, a general sectional view of a combustion chamber of a turbojet engine comprising a prior art injection system.
Figure 2:
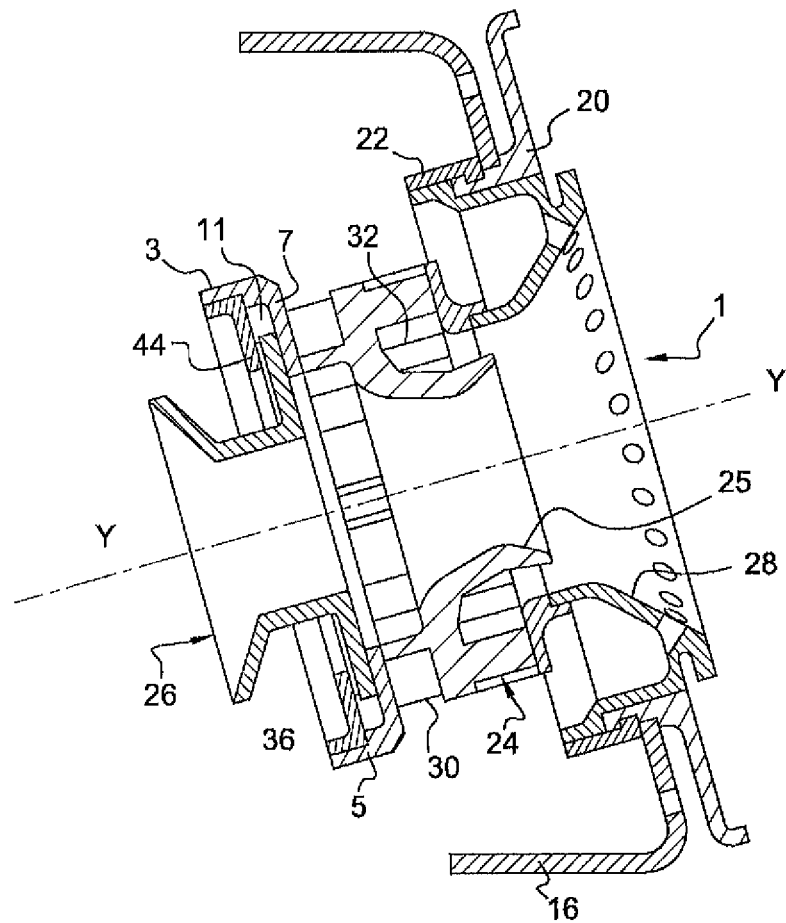
in FIG. 2, an enlarged general sectional view of the injection system of FIG. 1.
Figure 3:
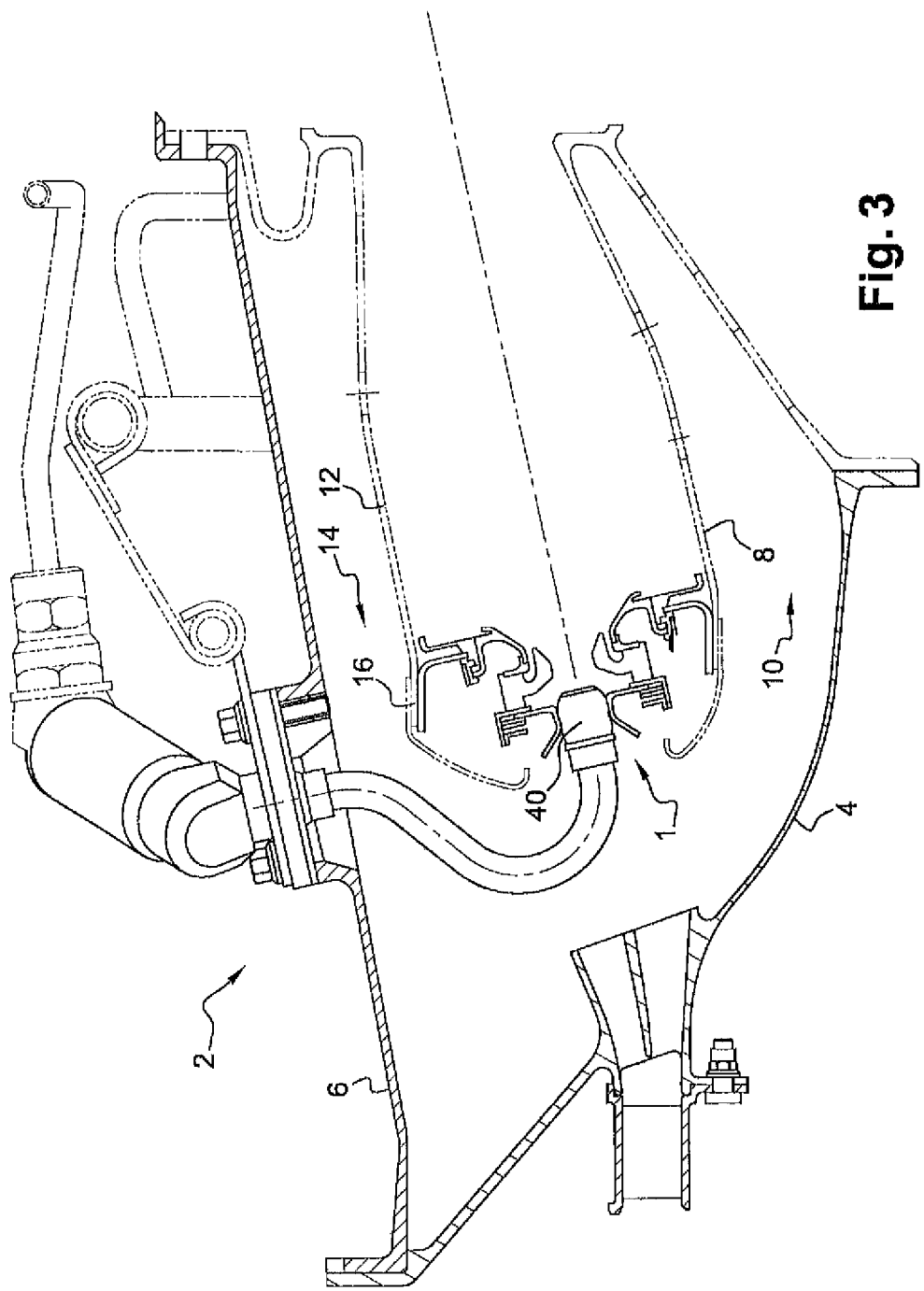
in FIG. 3, a general sectional view of a combustion chamber of a turbojet engine comprising an injection system in accordance with the invention.

FIG. 3 shows a diagrammatic partial sectional view of a combustion chamber of a turbojet engine in accordance with the invention denoted by general reference numeral 2. This combustion chamber comprises an injection system 1 in accordance with the present invention.

The combustion chamber 2 has longitudinal rotational symmetry with respect to a general axis of the turbine. The combustion chamber comprises an inner casing wall 4 and an outer casing wall 6. An inner chamber wall 8 defines a passage 10 with the inner casing wall 4 and an outer chamber wall 12 defines a passage 14 with the outer casing wall 6.

The inner 8 and outer 12 chamber walls are connected via a chamber base 16 at their upstream ends. A plurality of injection systems 1, typically fourteen to twenty-two, which are evenly angularly spaced (only one injection system has been shown in FIG. 3) are provided on the chamber base 16.

Figure 4:
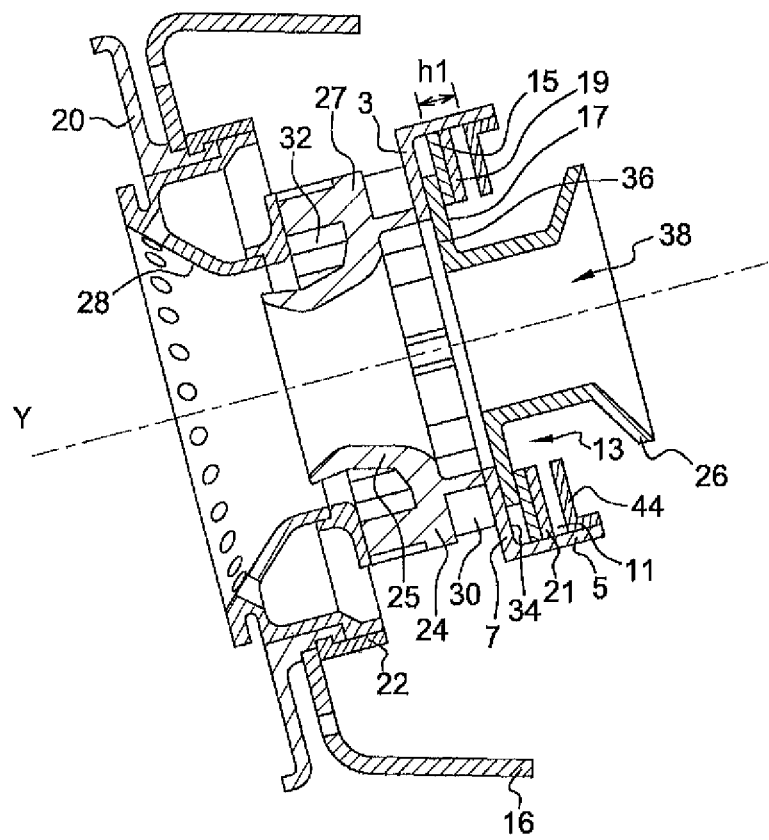
in FIG. 4, an enlarged general sectional view of an injection system in accordance with the invention.

As can be seen in more detail in FIG. 4, each injection system 1 comprises a fixed portion 3 which comprises a cavity 11 defined by a base 7, a side wall 5 and a closing cup 44. The centre of the base 7 is perforated by a cylindrical orifice such that the base is in the form of a ring, as is the closing cup 44. Thus, the cavity is not completely closed. The side wall 5 has a cylindrical shape about a reference axis Y.

The fixed portion 3 also comprises a swirler element 24, a Venturi 25 and a bowl 28. The base 7 forms a shoulder which projects radially from the swirler element 24, The swirler element 24 is mounted on the bowl 28. The bowl 28 is connected to the chamber base 16 via a deflector 20 and two half-rings 22. The swirler element 24 comprises a first and a second stage of blades or ribs 30, 32 which function so as to cause the air to rotate about the reference axis Y of the injection system. The blades or ribs of stages 30 and 32 may be orientated in the same or in opposing directions. The fixed portion 3 extends about the reference axis Y and has rotational symmetry about this axis.

The injection system 1 also comprises a sliding cross-member 26 which comprises a flange 36. The flange 36 of the sliding cross-member 26 is located in the cavity 11 and it bears on the base 7 of the cavity 11.

The sliding cross-member 26 further comprises a centring portion, for example a centring cone 38, which is intended to centre a fuel injector 40 with respect to the injection system 1. The centring portion projects from the cavity through the orifice located in the middle of the closing cup 44.

The injection system 1 also comprises a washer 15 bearing on the upper surface 17 of the flange 36. The injection system. 1 further comprises spring means 19 bearing on the washer 15.

Figure 5:
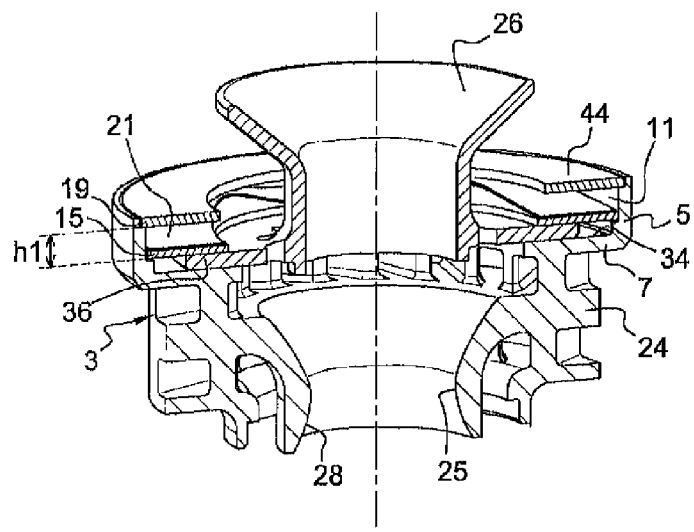
in FIG. 5, an enlarged perspective view of the injection system of FIG. 4.

As can be seen in more detail in FIG. 5, the spring means 19 are formed by a circular corrugated plate 21, in the form of a ring. The spring means also have rotational symmetry with respect to the reference axis Y.

The corrugated plate 21 is preferably formed from a metal alloy which can tolerate a temperature of close to 600° C., preferably a nickel-chromium alloy having, the following composition, for example:

has rotational symmetry with respect to an axis with reference Y. The base 7 is surrounded by a side wall 5 which is cylindrical about the reference axis Y. The sliding cross-member 26 comprises a flange 36 in the form of a ring at the top of which is a centring cone 38 for receiving the injector tip 40. The sliding cross-member also has rotational symmetry with respect to the axis with reference Y.

Figure 6A:
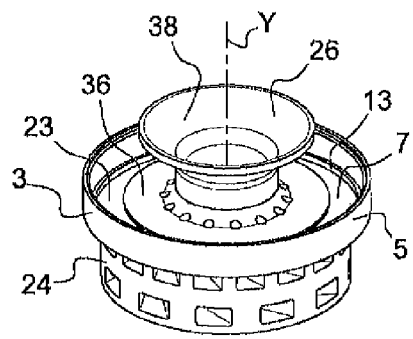
in FIGS. 6a to 6d, enlarged general perspective views of steps of an assembly method in accordance with the invention.

During a first step (a), represented in FIG. 6a, the sliding cross-member is positioned on the fixed portion 3 such that the flange 36 bears against the base V.

Figure 6B:
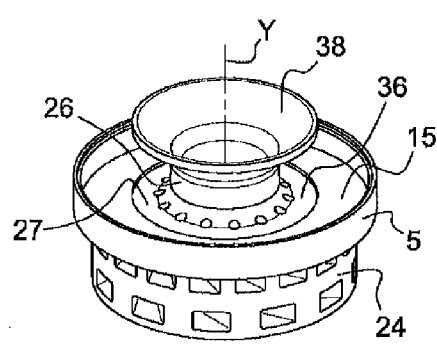
Figure 6C:
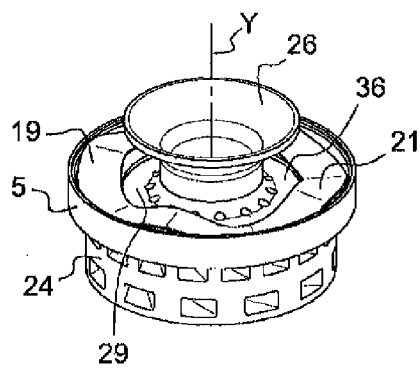

During a second step (a'), represented in FIG. 6b, a washer 15 is positioned on the upper surface of the flange 36. The washer 15 has a central orifice 27 through which the centring cone 38 of the sliding cross-member projects. The external diameter of the washer is preferably substantially equal to the internal diameter of the cavity, such that the washer is in contact with the side walls 5 of the cavity.

|  | Ni | Cr | Fe | Mo | Nb | Co | Mn | Cu | Al | Ti | Si | C | S | P | B |
|---|---|---|---|---|---|---|---|---|---|---|---|---|---|---|---|
| % by wt. | 50.0-55.0 | 17.0-21.0 | qs 100% | 2.80-3.30 | 4.75-5.50 | 1.0 max | 0.35 max | 0.30 max | 0.20-0.80 | 0.65-1.15 | 0.35 max | 0.08 max | 0.015 max | 0.015 max | 0.006 max |

The corrugated plate 21 is preferably corrugated so as to allow it to come into local contact with the closing cup 44 and with the washer 19. These crimps are distributed circumferentially on the corrugated plate.

The corrugated plate is axially constrained when assembled between the closing cup 44 and the washer 15, such that it exerts an axial force on the flange 36 of the sliding cross-member 26 via the washer 15.

The force exerted by the spring means 19 on the flange 36 via the washer 15 is selected such that in the absence of thermal expansion, the sliding cross-member cannot be displaced in the cavity, but in the presence of thermal expansion, the sliding cross-member can be displaced radially so that it can accommodate differential thermal expansion.

Thus, the spring means 19 keep the flange 36 pressed axially against the base 7 of the cavity, which means that vibrations of the sliding cross-member are avoided and premature wear of the injector tip which is inserted in the sliding cross-member is avoided. Furthermore, the spring means can deform in the event of thermal expansion of the injection system and/or the injector.

The washer 15 can be used to distribute the force exerted by the spring means over the flange 36. Further, the washer 15 can be used to prevent the spring means 19 from becoming wedged between the side wall 5 of the cavity and the flange 26 of the sliding cross-member.

The injection system of the invention may also exhibit the feature of having a cavity 11 with a height h1 along the axis Y which is greater than the height of prior art injection systems. In accordance with the invention, the cavity 11 must be able to contain the washer 15 and the spring means 19 in addition to the flange 36. To this end, the base 7 is lower down in the swirler element 24, while the closing cup 44 remains in the same position as the closing cups of prior art injection systems. In fact, the closing cup 44 cannot be displaced, because the aerodynamics of the paths 10 and 14 in which the gases move must not be modified.

An assembly method in accordance with the invention will now be described in detail with reference to FIGS. 6a to 6d.

FIG. 6a represents a fixed portion 3 comprising a swirler element 24 at the top of which is a shoulder 23 which forms a base 7 of a housing 13. The base 7 is in the shape of a ring and During a third step (b), represented in FIG. 6c, spring means 19 are disposed on the washer 15. These spring means are in this case constituted by a circular metallic corrugated plate 21 in the form of a ring. The corrugated plate 21 has an external diameter which is substantially equal to the internal diameter of the cavity, such that the corrugated plate is in contact with the side walls of the cavity. The centre of the corrugated plate 21 has an orifice with an internal diameter which is greater than the external diameter of the centring cone of the sliding cross-member, such that in the event of differential expansion, the corrugated plate can deform radially without being constrained by the external walls of the centring cone. The washer 15 and the corrugated plate 21 thus surround the centring cone without touching it.

Figure 6D:
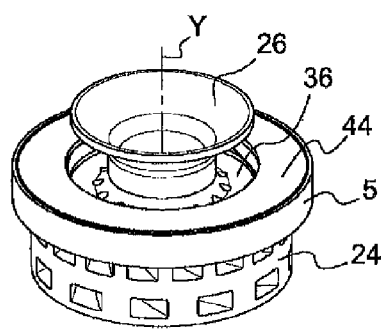

During a fourth step (c), represented in FIG. 6d, the closing cup 44 is fixed to the side wall 5 so as to form a cavity 11 in which the spring means 11 are axially constrained between the closing cup 44 and the washer 15.

To this end, the closing cup is welded to the side wall 5, for example. The height at which the closing cup 44 is fixed with respect to the base of the cavity is calculated so that the spring means exert a force on the flange which is sufficiently large to prevent any travel of the sliding cross-member in the cavity 11. However, the maximum force of the pre-stress applied to the flange by the spring means must not impede displacement of the sliding cross-member with respect to the fixed portion in order to accommodate differential expansion.

Naturally, the invention is not limited to the embodiments described hereinabove with reference to the figures; variations could be envisaged without departing from the scope of the invention. As an example, the shape of the fixed portion has only been described by way of indication; other shapes may be envisaged. Similarly, the combustion chamber could have another geometry without departing from the scope of the invention, The use of other geometries for the spring means could also be imagined without departing from the scope of the invention.

The invention claimed is:

1. A fuel injection system for a turbojet engine, comprising:
    a fixed portion and a sliding cross-member, the fixed portion and the sliding cross-member extending along a reference axis, the fixed portion comprising a cavity defined axially by a base and a closing cup, the sliding cross-member being provided with a flange contained in the cavity;

a spring disposed in the cavity so as to exert an axial force on the flange.

2. The injection system as claimed in claim 1, wherein the spring comprises a corrugated plate.

3. The injection system as claimed in claim 2, wherein the corrugated plate is circular.

4. The injection system as claimed in claim 1, wherein the spring is axially constrained in the cavity.

5. The injection system as claimed in claim 1 comprising a washer disposed between the spring and the flange.

6. The injection system as claimed in claim 1 wherein the spring is configured to exert a force in the range 10 Newtons to 30 Newtons on the flange.

7. A combustion chamber comprising at least one injection system as claimed in claim 1, the sliding cross-member further comprising a centring cone in which a fuel injector is inserted.

8. An aircraft engine comprising a combustion chamber as claimed in claim 7.

9. A method for assembling an injection system comprising a fixed portion and a sliding cross-member, the fixed portion comprising a housing having a base, the sliding cross-member comprising a flange, the method comprising:

(a) positioning the sliding cross-member on the fixed portion such that the flange bears on the base of the housing;
(b) positioning a spring; and
(c) fixing a closing cup on the housing so as to form a cavity in which the spring is axially constrained.

10. A method as claimed in claim 9, comprising between (a) and (b):

(a') positioning a washer on the flange.

11. A fuel injection system for a turbojet engine, comprising:

a fixed portion and a sliding cross-member, the fixed portion and the sliding cross-member extending along a reference axis, the fixed portion comprising a cavity defined axially by a base and a closing cup, the sliding cross-member being provided with a flange contained in the cavity; and spring means disposed in the cavity so as to exert an axial force on the flange.

12. The injection system as claimed in claim 11, wherein the spring means comprise a corrugated plate.

13. The injection system as claimed in claim 12, wherein the corrugated plate is circular.

14. The injection system as claimed in claim 11, wherein the spring means are axially constrained in the cavity.

15. The injection system as claimed in claim 11, comprising a washer disposed between the spring means and the flange.

* * * * *

UNITED STATES PATENT AND TRADEMARK OFFICE
CERTIFICATE OF CORRECTION

| | |
|---|---|
| PATENT NO. | : 9,188,064 B2 |
| APPLICATION NO. | : 13/812259 |
| DATED | : November 17, 2015 |
| INVENTOR(S) | : Jacques Marcel Arthur Bunel et al. |

It is certified that error appears in the above-identified patent and that said Letters Patent is hereby corrected as shown below:

On title page, Item (72) Inventors:

Please correct first inventor, Jacques Marcel Arthur BUNEL's, residence information to read:

Jacques Marcel Arthur BUNEL, Thiais (FR)

Signed and Sealed this
First Day of March, 2016

Michelle K. Lee
*Director of the United States Patent and Trademark Office*